Patented Aug. 8, 1944

2,355,067

UNITED STATES PATENT OFFICE 2,355,067

BRAZING SOLDER

Melvin M. Goldsmith, Chicago, Ill., assignor to Goldsmith Bros. Smelting & Refining Company, a corporation of West Virginia No Drawing. Original application March 3, 1941, Serial No. 381,595, now Patent No. 2,310,231, dated February 9, 1943. Divided and this application May 6, 1942, Serial No. 441,967

3 Claims. (Cl. 75—155)

This invention relates to an improved brazing solder.

Brazing solders, or hard solders are employed for soldering purposes where the ordinary soft solders have not sufficient strength, or do not have sufficient corrosion resistance. Such brazing solders preferably have a melting point as low as 1175° F. or thereabouts, although in some cases they are prepared with melting points as high as 1350° F.

The basis of most brazing solders is silver, although in many of them copper predominates. Silver and copper are employed in order to give strength to the solder, but the melting points of these metals, or mixtures of them, are too high for the purposes desired. Therefore, various metals have been used to lower the melting point. Zinc is the most common of these. Zinc alone, however, has a tendency to make the solder non-free flowing or stiff, and other metals are frequently used to make the solder flow more freely. Cadmium is a typical example of such a metal.

Silver and zinc form a eutectic with about 4 to 1 ratio of silver to zinc. Although the presence of other metals affects the eutectic ratio considerably, in preparing the present alloy or solder it is preferred that silver predominate greatly over the zinc.

In accordance with the present invention the melting point of silver-containing brazing solders is lowered markedly by the inclusion therein of a very small percentage of sodium metal. The amount of the sodium is ordinarily 1% to 2%, and should be less than 5%. Strangely enough, while sodium does not markedly lower the melting point of silver or zinc when added to either of them in small proportions, a minor amount does markedly affect a silver copper alloy, particularly in the presence of zinc. Even amounts as low as 0.05% markedly affect the solder. In addition to its advantage in lowering the melting point, however, the sodium makes the solder extremely penetrating, partially because it is possible to eliminate considerable zinc. It also reduces the tendency to oxidation, and the potential alkalinity of the sodium is of value in counteracting oxidation and acidity. The solder is, therefore, unusally corrosion resistant.

In preparing the alloy the sodium is preferably alloyed with the zinc. This may be done by melting the zinc and immersing the sodium in it while protecting the whole from air by the use of a cover. An effective cover may be produced by the use of sugar, which promptly forms charcoal, and a small amount of borax sufficient to bind the particles of charcoal together.

It is possible to incorporate the sodium with the silver, although on account of the high melting point of the silver this is not so desirable. Where an exclusively silver sodium, and copper material is employed this procedure should be followed, however, because the sodium does not readily combine.

The following are examples of alloys containing phosphorus:

| | Per cent |
|---|---|
| Silver | 10 to 15 |
| Cadmium | 10 to 15 |
| Copper | 55 to 70 |
| Zinc | 7 to 12 |
| Sodium | 0.05 to 1.0 |
| Phosphorus | 0.04 to 1.5 |

A preferred phosphorus-containing alloy is:

| | Per cent |
|---|---|
| Silver | 13.5 |
| Cadmium | 14.0 |
| Sodium | 0.25 |
| Zinc | 8.75 |
| Phosphorus | 1.5 |
| Copper | 62.0 |

Another alloy of the same general type is:

| | Per cent |
|---|---|
| Silver | 13.5 |
| Cadmium | 11.0 |
| Sodium | 0.25 |
| Zinc | 8.75 |
| Phosphorus | 1.5 |
| Copper | 65.0 |

This application is a continuation-in-part of my co-pending application Serial No. 261,345, filed March 11, 1939, and a division of my co-pending application 381,595, filed March 3, 1941.

The foregoing detailed description has been given for clearness of understanding only, and no unnecessary limitations should be understood therefrom.

What I claim as new, and desire to secure by Letters Patent, is:

1. A solder consisting essentially of:

| | Per cent |
|---|---|
| Silver | 10 to 15 |
| Cadmium | 10 to 15 |
| Copper | 55 to 70 |
| Zinc | 7 to 12 |
| Sodium | 0.05 to 1.0 |
| Phosphorus | 0.04 to 1.5 | the amount of impurities being insufficient to alter the essential properties of the alloy.

2. A solder consisting essentially of:

| | Per cent |
|---|---|
| Silver | 13.5 |
| Cadmium | 14.0 |
| Zinc | 8.75 |
| Copper | 62.0 |
| Sodium | 0.25 |
| Phosphorus | 1.5 |

3. A solder consisting essentially of 10% to 15% of silver; 0.2% to 1.5% of sodium; the balance being copper, cadmium, zinc and phosphorus, the copper being at least 55% of the total, the phosphorus not exceeding 1.5%, the zinc not exceeding 12%, the copper not exceeding 85%, and the cadmium not exceeding 15%.

MELVIN M. GOLDSMITH